No. 630,406. Patented Aug. 8, 1899.
S. W. PUFFER.
RADIOGRAPHIC APPARATUS.
(Application filed Feb. 27, 1899.)
(No Model.) 2 Sheets—Sheet 2.
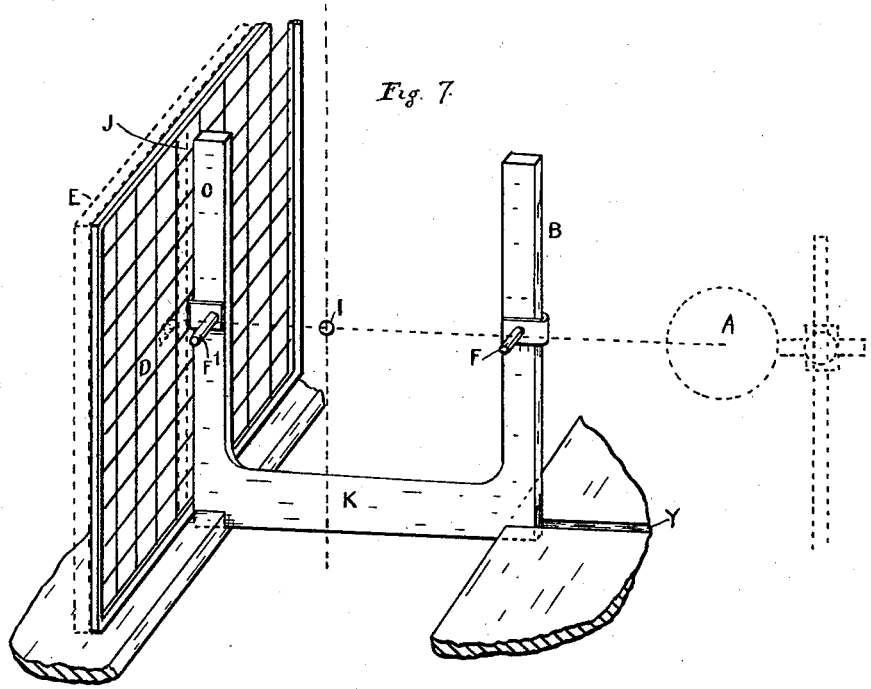
Fig. 7.
Fig. 8.
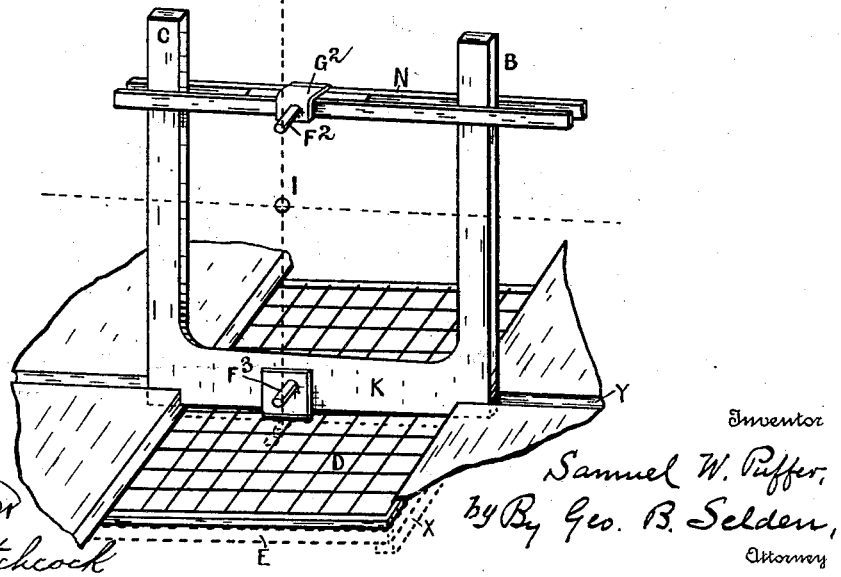
Witnesses
Orrin Parker
Wm. F. Hitchcock
Inventor
Samuel W. Puffer,
by Geo. B. Selden,
Attorney

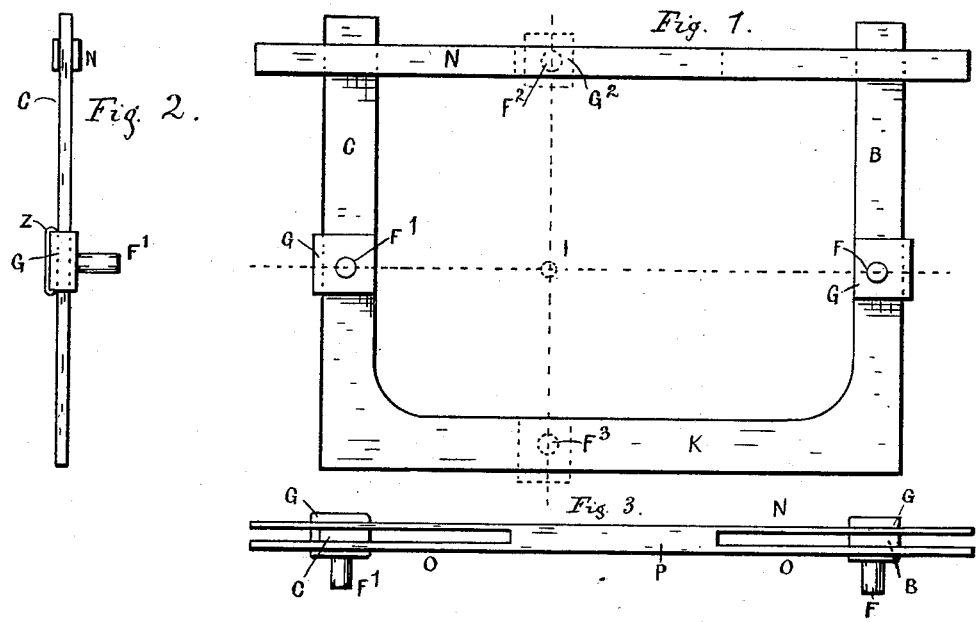

UNITED STATES PATENT OFFICE.

SAMUEL W. PUFFER, OF ROCHESTER, NEW YORK.

RADIOGRAPHIC APPARATUS.

SPECIFICATION forming part of Letters Patent No. 630,406, dated August 8, 1899.

Application filed February 27, 1899. Serial No. 706,938. (No model.)

*To all whom it may concern:*

Be it known that I, SAMUEL W. PUFFER, a citizen of the United States, residing at Rochester, New York, have invented an Improvement in Radiographic Apparatus, of which the following is a specification, reference being had to the accompanying drawings.

My invention relates to an improvement in radiographic apparatus whereby the accurate location of the position of a foreign object in a permeable substance is secured and the manipulation of the apparatus facilitated.

My invention is fully described and illustrated in the following specification and the accompanying drawings, the novel features thereof being specified in the claims annexed to the said specification.

In the accompanying drawings, representing my invention, Figure 1 is a side view of the fluorometer. Fig. 2 is an end view of the same. Fig. 3 is a top view of the same. Fig. 4 represents one of the movable indicators detached. Figs. 5 and 6 represent modified forms of the fluorometric instrument. Fig. 7 represents the apparatus arranged to locate the position of the object in one direction. Fig. 8 represents the apparatus arranged to locate the position of the object in a plane at right angles to that shown in Fig. 7.

In the accompanying drawings, A represents a vacuum-tube or other suitable source of the Roentgen or X rays; B C, the parallel bars of the fluorometric instrument; D, the screen, and E a fluoroscopic or photographic surface or plate. The permeable subject, such as any portion of the human or other animate body, is placed for radiographic observation between the parallel impermeable bars or rods B and C, which may be directly connected together, as shown, or may be relatively adjustable in any suitable or preferred manner. On each of the bars B and C is placed an adjustable indicator F F', which, as in the instance shown, may be a pin attached to a clip G, arranged to slide lengthwise on the bars with a friction which will retain it in place in any position in which it may be set. The clip G is made open on one side and of such a form as to elastically engage with the opposite sides of the bars, so that it may be readily adjusted lengthwise thereon with friction sufficient to hold it in place in any position in which it may be set. To secure ease and smoothness of movement, I provide one of the arms of the clip with a covering of rubber Z, Fig. 4. If preferred, the clips may be provided with any suitable clamp operated by a screw. I, Fig. 7, represents the foreign or impermeable body which it is desired to locate in its position in the permeable substance.

In practical use the permeable substance or part of the body supposed to contain the foreign or impermeable object is placed between the parallel bars B and C, the source A being on one side of the bars and the screen or receptive surface on the other. The fluorometer bars B and C may be of such forms as are shown in Figs. 5 and 6, separate and relatively adjustable. A series of connected bars similar to that shown in Fig. 1, of different widths between the bars, may be employed, each different size being adapted to use on different portions of the body, and for the permeable subjects of the larger dimensions such bars as are indicated in Figs. 5 and 6 may be provided in pairs, the members of each pair being supported in any suitable way so as to be relatively adjustable, and such measurements may be made as will exactly locate the foreign body or object relatively to the surfaces of the subject in one direction, the source and indicators being adjusted relatively to the subject or the object or to each or any of the others until the desired coincidence of the shadows cast by the indicators and the object has been attained. Means for adjusting the source are too well known to require description. The bars B and C when the tube is properly arranged will throw a coincident shadow J on the screen, fluorescent surface, or sensitive plate, and the indicators or pins F F' will throw a shadow coincident with that of the foreign or impermeable body I when adjusted relatively to the source in the proper parallelism of the rays.

The fluorometric instrument, of any construction, may be supported in the upright position in any suitable manner. The simplest manner is by means of a slot Y, Fig. 7, in the operating-table, in which the lower edges of the fluorometer are inserted; but any other suitable means, such as foot-pieces or other devices, may be employed. The screen and a suitable receptive surface or plate, such as any suitable fluoroscope or sensitive photographic film, are supported in suitable relation with the other parts of the apparatus in any suitable or preferred manner. As shown, the bars B and C are connected together by the arm K; but it will be obvious that a number of such angle-plates may be provided, having the bars B and C at such distances apart as to fit any portion of the human anatomy or that the bars may be adjustably supported or connected in any suitable way. It will also be obvious that instead of the pins F the indicators may be given any suitable shape.

After the foreign body has been located in one direction it will be readily understood that it may be located in the other direction by shifting its position a quarter of a revolution or by arranging the apparatus at right angles to the first position. It is preferable, however, to make the second observation, when required, without moving the subject or disturbing its relations with the fluorometric instrument. For this purpose I apply to the parallel bars B and C the adjustable bar N, which for convenience I call the "transverse" bar. It is arranged to slide freely on the fluorometer-bars B and C, and an indicator $F^2$ is provided for it. The transverse bar may be constructed in any suitable way so that it may be adjusted on the fluorometric instrument. In the construction shown it consists of two slightly-elastic strips O, connected together near their centers by the piece P. The indicator $F^2$ is adjustably attached to the transverse bar by the clip $G^2$. A corresponding pin $F^3$ is attached to the bar K or the horizontal portion of the fluorometric instrument. The screen D and the fluoroscope or sensitive plate E are supported below the table in any suitable or preferred manner, such as by a pair of cleats X, Fig. 8, into which these parts slide. The table W is of any suitable construction, being preferably provided with an opening through which the observation in the vertical direction may be made. The table may be provided with removable pieces to vary the dimensions of the opening, and any suitable number of slots may be provided to receive the fluorometric instruments.

The manner of using my improved fluorometric instrument will have been already understood from the preceding description. The subject for examination having been arranged between the bars and the tube excited, such relative adjustments are made as will cause the bars B and C to throw a coincident shadow J on the fluoroscope near the shadow of the object I. One of the pins F is then adjusted on one of the bars so that its shadow coincides with or is adjacent to the shadow of the object. The other pin is then placed on the other bar at a distance from the table corresponding with that of the first pin. The position of the shadow of the second indicator is then observed, and such relative readjustments of the tube and the indicator are made as will secure the coincidence or near approach to each other of the three shadows of the object and the two pins. I have ascertained that the divergence of the X-rays from a certain radiation is thirteen-sixteenths of an inch in sixteen inches, and a knowledge of this fact will assist the skilful manipulator in arranging the apparatus in the parallelism of the rays quickly and without loss of time. The screen is formed with meshes of a given dimension—say one inch—and by this the distance of the object from the top of the table or other horizontal line is readily ascertained, suitable scales or other measuring implements being employed. The position of the object is then marked on the subject by iodin, nitrate of silver, or other suitable chemical. The observation in a direction at an angle with that first made is carried out in a similar manner, the positions of the tube and the fluoroscope being suitably changed, the movable transverse bar being used and the indicators put in the proper positions. In this way the position of a foreign object in any part of the body is readily and accurately located, and the knowledge thus acquired serves as a guide in any subsequent operations for the removal of the object.

I claim—

1. The combination with a source of X-rays and a suitable receptive surface, of two parallel impermeable bars, arranged one between the source and the permeable subject, and the other between the permeable subject and the receptive surface, and the adjustable impermeable indicators on the bars, as and for the purposes set forth.

2. The combination with a source of X-rays, a suitable receptive surface and an impermeable screen, of two parallel impermeable bars, arranged one between the source and the permeable subject, and the other between the permeable subject and the screen and the receptive surface, and the adjustable impermeable indicators on the bars, as and for the purposes set forth.

3. In a radiographic apparatus, the combination of the two parallel impermeable bars, each provided with an adjustable impermeable indicator, as and for the purposes set forth.

4. In a radiographic apparatus, the combination of the screen and a receptive surface, and the two impermeable parallel bars, each provided with an adjustable indicator, as and for the purposes set forth.

5. In a radiographic apparatus, the combination of the impermeable bar with the adjustable impermeable laterally-projecting indicator, as and for the purposes set forth.

6. In a radiographic apparatus, the combination of the impermeable bar with the adjustable impermeable laterally-projecting indicator attached to the bar by an elastic clip, as and for the purposes set forth.

7. In a radiographic apparatus, the combination of the two parallel impermeable bars, the transverse bar, the adjustable transverse bar, the adjustable impermeable indicators on the transverse bars, a movable source of X-rays, and the movable receptive surface, as and for the purposes set forth.

8. In a radiographic apparatus, the combination of the two parallel impermeable bars, each provided with an adjustable impermeable laterally-projecting indicator, the transverse bar, the adjustable transverse bar, the adjustable impermeable laterally-projecting indicators on the transverse bars, a movable source of X-rays, and the movable receptive surface, as and for the purposes set forth.

9. The combination with the parallel impermeable bars of a radiographic apparatus, of the adjustable transverse bar formed of two elastic strips suitably connected together, as and for the purposes set forth.

SAMUEL W. PUFFER.

Witnesses:
  ORIN PARKER,
  WM. F. HITCHCOCK.